US010587847B2

(12) United States Patent
Liu et al.

(10) Patent No.: US 10,587,847 B2
(45) Date of Patent: Mar. 10, 2020

(54) CONTENT CAPTURE AND TRANSMISSION OF DATA OF A SUBJECT TO A TARGET DEVICE

(71) Applicant: Beijing Zhigu Rui Tuo Tech Co., Ltd, Beijing (CN)

(72) Inventors: Jia Liu, Beijing (CN); Wei Shi, Beijing (CN)

(73) Assignee: BEIJING ZHIGU RUI TUO TECH CO., LTD, Beijing (CN)

(*) Notice: Subject to any disclaimer, the term of this patent is extended or adjusted under 35 U.S.C. 154(b) by 24 days.

(21) Appl. No.: 15/035,202

(22) PCT Filed: Nov. 6, 2014

(86) PCT No.: PCT/CN2014/090432
§ 371 (c)(1),
(2) Date: May 6, 2016

(87) PCT Pub. No.: WO2015/067188
PCT Pub. Date: May 14, 2015

(65) Prior Publication Data
US 2016/0286153 A1    Sep. 29, 2016

(30) Foreign Application Priority Data

Nov. 7, 2013    (CN) .......................... 2013 1 0551728

(51) Int. Cl.
*H04N 7/18*    (2006.01)
*H04N 5/232*    (2006.01)
(52) U.S. Cl.
CPC ......... *H04N 7/188* (2013.01); *H04N 5/23203* (2013.01)
(58) Field of Classification Search
None
See application file for complete search history.

(56) References Cited

U.S. PATENT DOCUMENTS 8,300,107 B2    10/2012    Strandwitz et al.
8,325,214 B2    12/2012    Hildreth
(Continued)

FOREIGN PATENT DOCUMENTS

CN    101242493 A    8/2008
CN    101681549 A    3/2010
(Continued)

OTHER PUBLICATIONS

International Search Report for PCT Application No. PCT/CN2014/090432, dated Feb. 11, 2015, 2 pages.

*Primary Examiner* — Justin P. Misleh
(74) *Attorney, Agent, or Firm* — Amin, Turocy & Watson, LLP

(57) ABSTRACT

The present application provides a shooting method and a shooting apparatus, relating to the field of wireless communications technologies. The method comprising: determining a subject according to sensor data of a target device and image information of a selectable subject; establishing a communication connection with at least one target device associated with the subject; and sending shooting data of the associated subject to the target device with which the connection has been established. According to the method and the apparatus in embodiments of the present application, a subject is determined according to sensor data of a target device and image information of a selectable subject; therefore, a signal source can be precisely matched with a physical device, that is, an object to which shooting data is transmitted can be determined accurately, to achieve precise transmission of the shooting data.

45 Claims, 4 Drawing Sheets

(56) References Cited

U.S. PATENT DOCUMENTS

| | | |
|---|---|---|
| 8,432,461 B2 | 4/2013 | Karn et al. |
| 2004/0169733 A1 | 9/2004 | Ishizaka et al. |
| 2005/0036044 A1 | 2/2005 | Funakura |
| 2007/0283296 A1 | 12/2007 | Nilsson |
| 2008/0008361 A1* | 1/2008 | Nozaki .................. H04N 5/232 382/118 |
| 2008/0297608 A1* | 12/2008 | Border ............... H04N 1/00204 348/207.11 |
| 2010/0311347 A1* | 12/2010 | Le Thierry D'Ennequin ............. H04N 1/32106 455/67.11 |
| 2011/0105179 A1* | 5/2011 | Tanabe .............. H04M 1/72533 455/556.1 |
| 2012/0032795 A1 | 2/2012 | Ishii et al. |
| 2013/0120596 A1 | 5/2013 | Yau |
| 2013/0231065 A1 | 9/2013 | Hayashi et al. |
| 2014/0036087 A1* | 2/2014 | Furue .................. G11B 27/034 348/157 |
| 2014/0368670 A1* | 12/2014 | Morley .............. H04N 5/23229 348/207.1 |
| 2015/0043886 A1* | 2/2015 | Bang ...................... H04N 7/188 386/223 |
| 2015/0109437 A1* | 4/2015 | Yang ...................... H04N 7/183 348/143 |
| 2015/0116501 A1* | 4/2015 | McCoy .............. H04N 5/23206 348/169 |

FOREIGN PATENT DOCUMENTS

| | | |
|---|---|---|
| CN | 101771750 A | 7/2010 |
| CN | 101874404 A | 10/2010 |
| CN | 201608784 U | 10/2010 |
| CN | 102624428 A | 8/2012 |
| CN | 102625036 A | 8/2012 |
| CN | 101101520 B | 11/2012 |
| CN | 102842213 A | 12/2012 |
| CN | 102932401 A | 2/2013 |
| CN | 103095345 A | 5/2013 |
| CN | 103118282 A | 5/2013 |
| CN | 103227907 A | 7/2013 |
| CN | 103248685 A | 8/2013 |
| CN | 103607538 A | 2/2014 |
| CN | 103701953 A | 4/2014 |
| WO | 2002067129 A1 | 8/2002 |
| WO | 2007138393 A2 | 12/2007 |
| WO | 2013086471 A1 | 6/2013 |

* cited by examiner

CONTENT CAPTURE AND TRANSMISSION OF DATA OF A SUBJECT TO A TARGET DEVICE

RELATED APPLICATION

The present application is a U.S. National Stage filing under 35 U.S.C. § 371 of international patent cooperation treaty (PCT) application No. PCT/CN2014/090432, filed Nov. 6, 2014, and entitled "CONTENT CAPTURE AND TRANSMISSION", which claims the benefit of priority to Chinese Patent Application No. 201310551728.9, filed on Nov. 7, 2013, which applications are hereby incorporated into the present application by reference herein in their respective entireties.

TECHNICAL FIELD

The present application relates to the field of wireless communications technologies, and in particular, to content capture and transmission, e.g., a shooting method or a shooting apparatus.

BACKGROUND

Currently, many devices with a shooting function have a wireless transmission function, which makes it possible to use a public device (or device of another person) to acquire a photo or video. For example, some parks, squares, scenic spots and other public places are equipped with many surveillance cameras, and users can use these cameras to obtain photos or images related to themselves. In addition, smart phone devices with a camera are also popular, and some new digital camera products (or the lenses) are also provided with a wireless function; by using these devices, some new social shooting applications can be achieved. For example, one person shoots a photo or video for himself by using another person's camera from the viewing angle of the other person. After the shooting has been completed, the shooting end transmits shooting data.

Such applications have a significant feature, that is, a receiving device of the shooting data should be a specific related device. That is to say, only when a photo (or video) is "shot" by using a certain user as a subject or is "about" a certain user, the related user is interested in acquiring it (or have the right to acquire it). However, the existing wireless communication technologies cannot fully satisfy requirements of the above applications. Because most wireless communication devices use omnidirectional antennas, a shooting device may transmit a photo (or video) to a device beyond a viewfinder vision, but users often neither want to receive a lot of photos of other persons nor want photos of their own to be acquired by unrelated persons. A communication range can be limited by using a directional antenna in coordination with a shooting direction of a lens; however, unrelated users within a certain angle range may still be involved.

SUMMARY

An example, non-limiting objective of the present application is to provide a shooting method and a shooting apparatus, which can achieve precise transmission of shooting data.

To these and/or related ends, in a first aspect of one or more embodiments of the present application, a shooting method is provided, and the method comprises steps of:

determining a subject according to sensor data of a target device and image information of a selectable subject;
establishing a communication connection with at least one target device associated with the subject; and
sending shooting data of the associated subject to the target device with which the connection has been established.

In a second aspect of one or more of the embodiments of the present application, a shooting apparatus is provided, and the apparatus comprises:

a subject determining module, configured to determine a subject according to sensor data of a target device and image information of a selectable subject;
a connection module, configured to establish a communication connection with at least one target device associated with the subject; and
a sending module, configured to send shooting data of the associated subject to the target device with which the connection has been established.

In a third aspect of the one or more of embodiments of the present application, a computer readable storage device is provided, comprising at least one executable instruction, which, in response to execution, causes a system comprising a processor to perform operations, comprising:
determining a subject according to sensor data of a target device and image information of a selectable subject;
establishing a communication connection with at least one target device associated with the subject; and
sending shooting data of the associated subject to the target device with which the connection has been established.

In a fourth aspect of the one or more of embodiments of the present application, a device for shooting is provided, comprising a processor and a memory, wherein the memory storing a computer executable instruction, the processor being connected with the memory via a communication bus, and when the device is operating, the processor executes or facilitates execution of the executable instructions stored by the memory to cause the device to perform operations, comprising:

determining a subject according to sensor data of a target device and image information of a selectable subject;
establishing a communication connection with at least one target device associated with the subject; and
sending shooting data of the associated subject to the target device with which the connection has been established.

According to the method and the apparatus in one or more of the embodiments of the present application, a subject is determined according to sensor data of a target device and image information of a selectable subject; therefore, a signal source and a physical device can be matched precisely, that is, an object to which shooting data is transmitted can be determined accurately, to achieve precise transmission of the shooting data.

DETAILED DESCRIPTION

Specific implementations of the present application are described in detail hereinafter with reference to the accompanying drawings and embodiments. The following embodiments are intended to describe the present application, but not to limit the scope of the present application.

For better understanding of the embodiments of the present application, terms used in the embodiments of the present application are now explained as follows:

Selectable subject: a human, an animal, or any other physical entity capable of moving or changing a posture, which can be used as a subject and can be identified, recognized or viewed by a shooting device; a selectable subject holds and/or carries at least one target device.

Target device: a terminal device (for example, a mobile phone, a camera, a handheld computer, a personal computer, a tablet computer, or a wearable smart device) capable of establishing a communication connection with the subject in a wireless manner; the target device may be held or carried by a selectable subject; the target device may be equipped with many possible sensors (a gravity sensor, an acceleration sensor, a gyroscope, and so on) or related sensor data related of the target device can be collected.

Shooting device: a device that implements shooting; in one or more of the embodiments of the present application, the shooting device at least has shooting and display functions, and can transmit, in a wireless manner, shooting data to a target device associated with the subject. The shooting device may be stationary or may be held or carried by a user. For example, the shooting device may be a micro digital camera, or a device (for example, a mobile phone, a camera, a handheld computer, a personal computer, a tablet computer, or a wearable smart device) comprising a micro digital camera; the micro digital camera refers to an apparatus that uses an electronic sensor to convert optical images into electronic data, comprises a lens, an image sensor, a DSP calculation unit and other components, and is capable of achieving functions of recording, processing and storing static or dynamic images.

In addition, the sensor data in the one or more of embodiments of the present application may comprise one or more of the following: velocity, acceleration, direction, angular velocity, and signal strength data, where the sensor data may be generated due to changes in movement or posture of the corresponding holder or carrier, and is used to recognize an action of the corresponding holder or carrier in one or more of the embodiments of the present application; the action can refer to an action that can be collected and recognized by the shooting device.

Figure 1:
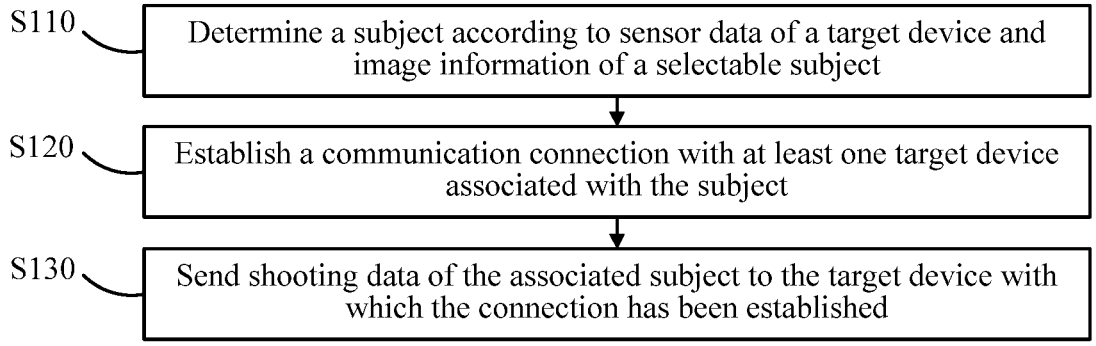
FIG. 1 is an example flowchart of a shooting method according to an embodiment of the present application.
Figure 2:
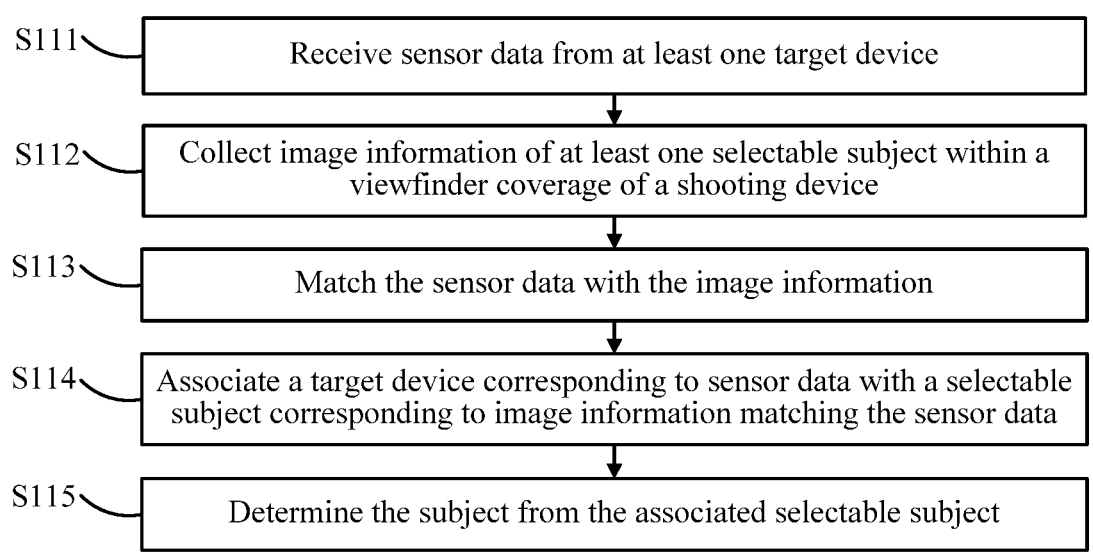
FIG. 2 is an example detailed flowchart of step S110 in the method shown in FIG. 1.

As shown in FIG. 1, a shooting method according to an embodiment of the present application comprises the following steps.

S110. Determine a subject according to sensor data of a target device and image information of a selectable subject.

In a method of an embodiment of the present application, the sensor data is from one or more target devices, after a holder or carrier of the target device completes a certain action or changes the posture, a series of related sensor data may be generated correspondingly, and the target device may directly send out all or part of original sensor data relevant to the action, and may also send out processed data that can be more easily or directly used for action recognition. According to a method of an embodiment of the present application, after the sensor data sent by the target device is received, at least one subject is determined from the selectable subject corresponding to image information that can be matched with the sensor information of the target device.

S120. Establish a communication connection with at least one target device associated with the subject.

S130. Send shooting data of the associated subject to the target device with which the connection has been established.

According to a method of an embodiment of the present application, a subject is determined according to sensor data of a target device and image information of a selectable subject; therefore, a signal source and a physical device can be matched precisely, that is, an object to which shooting data is transmitted can be determined accurately, to achieve precise transmission of the shooting data.

Specifically, step S110 further comprises the following steps.

S111. Receive sensor data from at least one target device.

The sensor data may be sent by the target device to a particular local device according to configuration of the target device and by using any possible communications protocol or sent by means of broadcasting. In a method of an embodiment of the present application, the sensor data is data sent by means of broadcasting. The sensor data comprises other information associated with the target device, for example, an ID of the target device, and a shooting request.

S112. Collect image information of at least one selectable subject within a viewfinder coverage of a shooting device.

The viewfinder coverage of the shooting device is a spatial range currently displayed on the shooting device, one or more selectable subjects may appear in the spatial range, and when a selectable subject appears in the viewfinder coverage of the shooting device, image information of the selectable subject appearing is collected.

S113. Match the sensor data with the image information.

After receiving the sensor data, the shooting device may analyze the sensor data, and recognize movement of the corresponding target device. An action of the target device may be recognized according to any possible action recognition method that is based on recognition of various sensor data and is known in the art, which is not described in detail herein. Certainly, when the sensor data is data that has been processed, the data may not be processed or less processing is performed on the data, and then an action of the target device is recognized. After the action of the target device is recognized, the action is matched with the collected image information.

S114. Associate a target device corresponding to sensor data with a selectable subject corresponding to image information matching the sensor data.

After the matching in step S113, a target device and a selectable subject that are corresponding to sensor data and image information that can be matched are associated, and it should be noted that, one selectable subject may be associated with multiple target devices.

S115. Determine the subject from the associated selectable subject.

In step S115, the subject may be determined automatically from the associated selectable subject according to a preset policy, or the subject may be determined from the associated selectable subject according to a user selection.

In one or more of the embodiments of the present application, the preset policy may comprise:

determining the subject from the corresponding associated selectable subject according to an image feature of an image presented within the viewfinder coverage of the shooting device. For example, when the proportion of the area occupied by an image of a selectable subject within a field of view of a local device is great (for example, the proportion exceeds a set value (e.g., exceeds 60%)), it can be roughly inferred that, at this time, a main focus of the shooting device is the selectable subject, and therefore, the selectable subject occupying a great proportion is selected as the subject. Also for example, when an image of a selectable subject is in a set region (for example, the middle) of a field of view of the shooting device, it can be roughly inferred that, at this time, a main focus of the shooting device is the selectable subject, and therefore, the selectable subject in the set region is selected as the subject. In addition, the preset policy may further comprise: determining a selectable subject according to signal strength of the associated target device, the signal strength being optionally comprised in the sensor data.

The preset policy may be a reasonable combination of the several policies in the foregoing. For example, both image features and signal strength of target devices are taken into consideration: first, selecting all selectable subjects, proportions of areas occupied by images of which within the viewfinder coverage of the shooting device exceed the set value, and then determining the subject according to signal strength of the associated target devices. Alternatively, signal strength is considered first, and then the location of the selectable subject is considered, etc.

Figure 3:
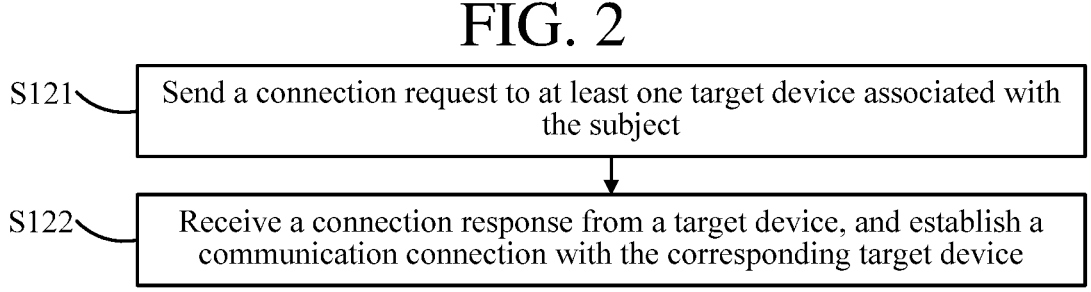
FIG. 3 is an example detailed flowchart of step S120 in the method shown in FIG. 1.

In addition, as shown in FIG. 3, step S120 further comprises the following steps.

S121. Send a connection request to at least one target device associated with the subject. After the subject is determined in step S110, a connection request is automatically sent to at least one target device associated with the subject.

S122. Receive a connection response from a target device, and establish a communication connection with the corresponding target device.

In addition, in step S110, the sensor data may be received according to a first communications protocol, and the first communications protocol is, for example, Bluetooth Low Energy (BLE), WiFi, Bluetooth, ZigBee, Ultra-Wideband (UWB), Infrared, Near Field Communication (NFC) or another short-distance wireless communications protocol. In step S121, the connection request may be sent, according to a second communications protocol, to the target device associated with the determined subject. The second communications protocol may also be any short-distance wireless communications protocol such as BLE, WiFi, Bluetooth, ZigBee, UWB, Infrared, or NFC; optionally, the first communications protocol and the second communications protocol are different communications protocols, for example, the BLE protocol is used in broadcasting and/or receiving the sensor data, while WiFi is used in sending and/or waiting for receiving the connection request and during subsequent transmission of shooting data, so as to save power consumption as much as possible. In addition, when different communications protocols are used for communication, packaged data packets are defined according to the corresponding protocols.

In step S121, the connection request should comprises device information of the shooting device, and the device information may comprise one or more of the following: a device ID of the shooting device, a position of the shooting device, shooting performance of the shooting device, and a relationship between the shooting device and the subject. The relationship may refer to one or more of: a distance between the shooting device and the subject, a shooting angle of the shooting device relative to the subject, and a face orientation of the subject within the viewfinder coverage of the shooting device. The device information of the shooting device may be used to provide a basis for selecting an appropriate shooting device by a subject. After receiving the connection request, the selectable subject may select a desired shooting device according to device information comprised in the connection request. For example, the selectable subject selects a shooting device with better shooting performance to shoot a photo or video for the selectable subject, or selects a shooting device with a better shooting angle to shoot a photo or video for the selectable subject, or the like.

Figure 4:
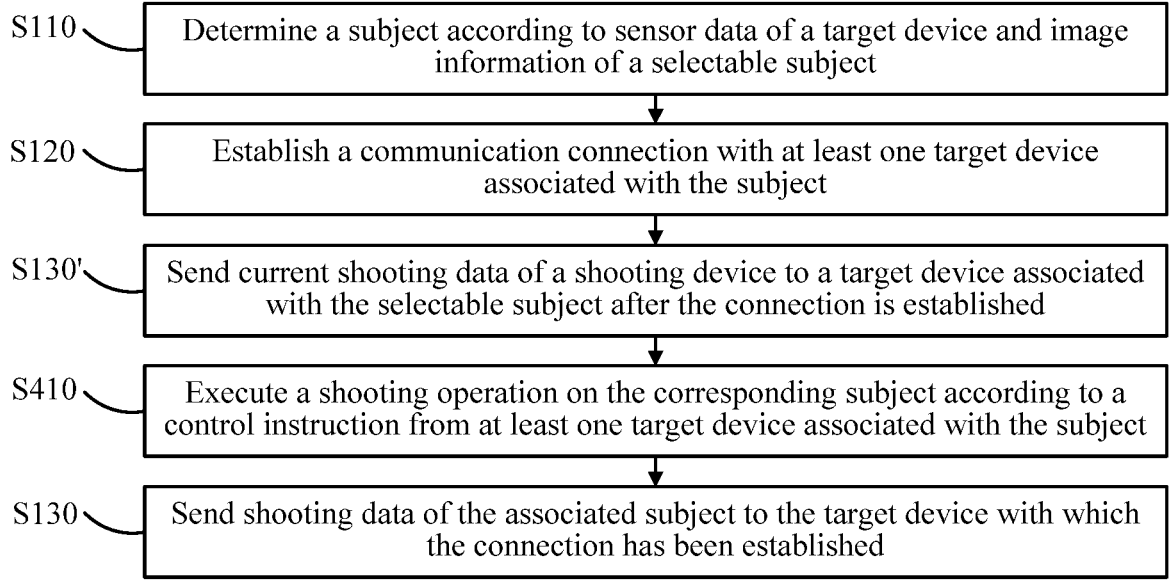
FIG. 4 is an example flowchart of a shooting method according to another embodiment of the present application.

After the connection is established, according to a method of an embodiment of the present application, the shooting device may be directly operated to shoot a photo or video, and step S130 is executed, to send shooting data to the target device associated with the subject. Alternatively, according to a method of an embodiment of the present application, shooting may be performed according to control of the selectable subject. At this time, as shown in FIG. 4, a method according to another embodiment of the present application further comprises the following step.

S410. Execute a shooting operation on the corresponding subject according to a control instruction from at least one target device associated with the subject.

In such case, step S130' is executed first, to send current shooting data of the shooting device to a target device associated with the selectable subject after the connection is established. On the target device, a desired control instruction may be generated automatically or by a user according to the current shooting data, for example, shooting parameters (a shutter parameter, an exposure parameter, an aperture parameters, etc.) are input automatically or by the user.

After the shooting device receives the control instruction, step S410 is executed, to provide a shooting prompt according to the control instruction. Then, step S130 is performed again, to send shooting data of the associated subject to the target device with which the connection has been established.

It should be noted that, the shooting operation may comprise adjustment on shooting parameters and/or execution of shooting. The adjustment on shooting parameters comprises commands of adjusting one or more of the following parameters: a position of the shooting device, a distance between the shooting device and the subject, an angle of the shooting device, lens aperture and white balance parameters of the shooting device, and the like, so as to achieve the best shooting effect of the shooting device for the subject. The execution of shooting comprises commands of executing photographing, starting shooting, pausing shooting, and ending shooting.

In order to ensure execution of the control instruction, a method of an embodiment of the present application may further comprise the following step:

Provide a shooting prompt according to the control instruction.

The providing a shooting prompt means to inform, by means of any one or more of a voice prompt, a visual prompt, and/or a vibration prompt, the shooting device or an operator of the shooting device of what operation needs to be performed next and how to perform the operation.

In addition, during the shooting in a method of an embodiment of the present application, a communication connection is established by precisely positioning a selectable subject and a target device thereof according to sensor data and image information, thereby achieving precise transmission. Therefore, when a subject and a shooting device thereof can no longer be precisely positioned, the established connection may be disconnected, so as to save device resources. Specifically, A method of an embodiment of the present application further comprises the following step:

Disconnect the connection with the target device associated with the subject when the subject leaves a viewfinder coverage for the subject. Alternatively, the method comprises the following step:

Disconnect the connection with the target device associated with the subject when signal strength of the target device associated with the subject is lower than a set threshold. The set threshold may be set appropriately on the premise that transmission of shooting data is not affected. Alternatively, the method comprises the following step:

Disconnect the connection with the target device associated with the subject when the shooting device cannot recognize the subject.

Further, according to actual applications, not all shooting data needs to be transmitted, and therefore, step S130 may comprise the following steps:

Send part of the shooting data of the associated subject to the target device with which the connection has been established, where the part of the shooting data is used to form a thumbnail on the target device.

The user can select desired complete shooting data on the target device according to the thumbnail.

Send, according to a user selection, corresponding shooting data to the target device with which the connection has been established.

Certainly, it is also feasible to directly send all the shooting data to the corresponding target device after the shooting is completed.

Those skilled in the art can understand that, in a method of an embodiment of the present application, sequence numbers of the steps do not mean an execution sequence, the execution sequence of the steps should be determined according to their functions and internal logic, but should not constitute any limitation on implementation of the specific embodiments of the present application.

Figure 5:
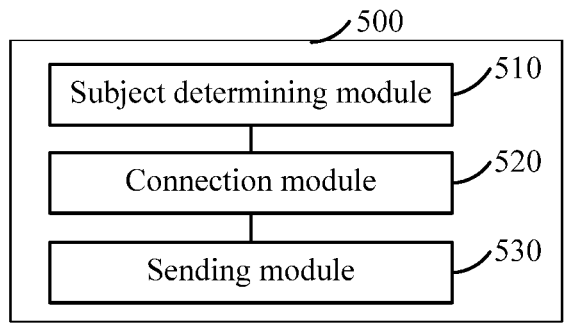
FIG. 5 is an example structural block diagram of a shooting apparatus according to an embodiment of the present application.

One or more of the embodiments of the present application further provide a shooting apparatus, and the apparatus may be a part of a shooting device or an auxiliary apparatus independent of the shooting device. As shown in FIG. 5, the shooting apparatus 500 according to an embodiment of the present application comprises the following modules:

A subject determining module 510, configured to determine a subject according to sensor data of a target device and image information of a selectable subject.

In an apparatus of an embodiment of the present application, the sensor data is from one or more target devices; after a holder or carrier of the target device completes a certain action or changes the posture, a series of related sensor data may be generated correspondingly, and the target device may directly send out all or part of original sensor data relevant to the action, and may also send out processed data that can be more easily or directly used for action recognition. According to an apparatus of an embodiment of the present application, after receiving the sensor data sent by the target device, the subject determining module 510 determines at least one subject from the selectable subject corresponding to image information that can be matched with the sensor information of the target device.

A connection module 520, configured to establish a communication connection with at least one target device associated with the subject determined by the subject determining module 510.

A sending module 530, configured to send shooting data of the associated subject to the target device with which the connection has been established.

According to an apparatus of an embodiment of the present application, a subject is determined according to sensor data of a target device and image information of a selectable subject; therefore, a signal source and a physical device can be matched precisely, that is, an object to which shooting data is transmitted accurately, to achieve precise transmission of the shooting data.

Figure 6:
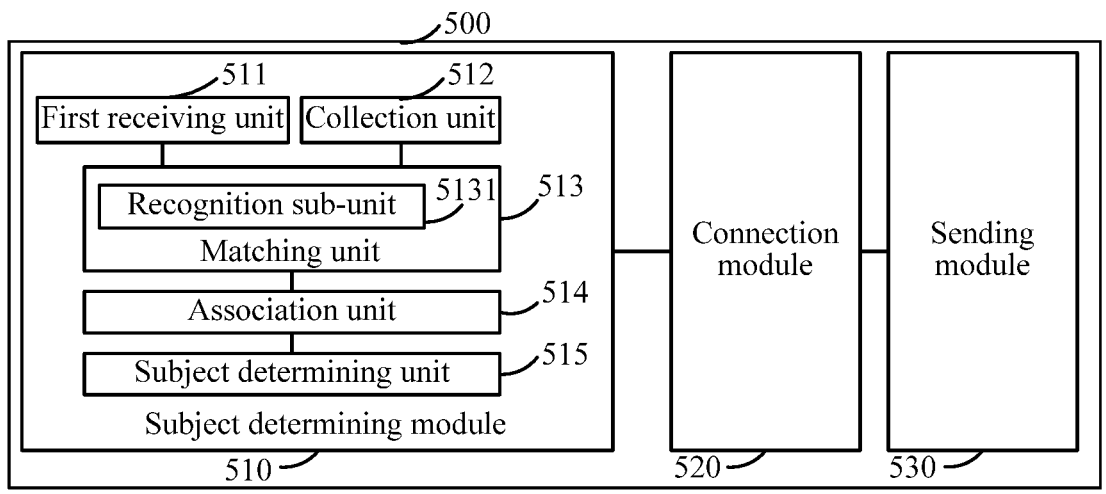
FIG. 6 is an example structural block diagram of a subject determining module in the apparatus shown in FIG. 5.

Specifically, as shown in FIG. 6, the subject determining module 510 further comprises the following units:

A first receiving unit 511, configured to receive sensor data from at least one target device.

The sensor data may be sent by the target device to a particular local device according to configuration of the target device and by using any possible communications protocol or sent by means of broadcasting. In a method of an embodiment of the present application, alternatively, the sensor data is data sent by means of broadcasting. The sensor data comprises other information associated with the target device, for example, an ID of the target device and a shooting request.

A collection unit 512, configured to collect image information of at least one selectable subject within a viewfinder coverage of a shooting device.

The viewfinder coverage of the shooting device is a spatial range currently displayed on the shooting device, one or more selectable subjects may appear in the space range, and when a selectable subject appears in the viewfinder coverage of the shooting device, image information of the selectable subject appearing is collected.

A matching unit 513, configured to match the sensor data with the image information.

The matching unit may further comprise a recognition sub-unit 5131, configured to analyze the sensor data after the shooting device receives the sensor data, and recognize movement of the corresponding target device. An action of the target device may be recognized according to any possible action recognition method that is based on recognition of various sensor data and is known in the art, which is not described in detail herein. Certainly, when the sensor data is data that has been processed, the data may not be processed or less processing is performed on the data, and then an action of the target device is recognized. After the action of the target device is recognized, the action is matched with the collected image information.

An association unit 514, configured to associate a target device corresponding to sensor data with a selectable subject corresponding to image information matching the sensor data.

After the matching performed by the matching unit 513, the association unit 514 associates a target device and a selectable subject that are corresponding to sensor data and image information that can be matched, and it should be noted that, one selectable subject may be associated with multiple target devices.

A subject determining unit 515, configured to determine the subject from the associated selectable subject.

The subject determining unit 515 may determine the subject automatically from the associated selectable subject according to a preset policy, or determine the subject from the associated selectable subject according to a user selection.

In an embodiment of the present application, the preset policy may comprise:

determining the subject from the corresponding associated selectable subject according to an image feature of an image presented within the viewfinder coverage of the shooting device. For example, when the proportion of the area occupied by an image of a selectable subject within a field of view of a local device is great (for example, the proportion exceeds a set value (e.g., exceeds 60%)), it can be roughly inferred that, at this time, a main focus of the shooting device is the selectable subject, and therefore, the selectable subject occupying a great proportion is selected as the subject. Also for example, when an image of a selectable subject is in a set region (for example, the middle) of a field of view of the shooting device, it can be roughly inferred that, at this time, a main focus of the shooting device is the selectable subject, and therefore, the selectable subject in the set region is selected as the subject. In addition, the preset policy may further comprise: determining a selectable subject according to signal strength of the associated target device, the signal strength being optionally comprised in the sensor data.

The preset policy may be a reasonable combination of the several policies in the foregoing. For example, both image features and signal strength of target devices are taken into consideration: first, selecting all selectable subjects, proportions of areas occupied by images of which within the viewfinder coverage of the shooting device exceed the set value, and then determining the subject according to signal strength of the associated target devices. Alternatively, signal strength is considered first, and then the location of the selectable subject is considered, etc.

In addition, the connection module 520 may further comprise the following units:

A first sending unit, configured to send a connection request to at least one target device associated with the subject. After the subject determining module 510 determines the subject, the first sending unit automatically sends a connection request to at least one target device associated with the subject.

A second receiving unit, configured to receive a connection response from a target device, and establish a communication connection with the corresponding target device.

In addition, the first receiving unit 511 may receive the sensor data according to a first communications protocol, and the first communications protocol is, for example, BLE, WiFi, Bluetooth, ZigBee, UWB, Infrared, NFC or another short-distance wireless communications protocol. The first sending unit 521 may send, according to a second communications protocol, the connection request to the target device associated with the determined subject. The second communications protocol may also be any short-distance wireless communications protocol such as BLE, WiFi, Bluetooth, ZigBee, UWB, Infrared, or NFC; optionally, the first communications protocol and the second communications protocol are different communications protocols, for example, the BLE protocol is used in broadcasting and/or receiving the sensor data, while WiFi is used in sending and/or waiting for receiving the connection request and during subsequent transmission of shooting data, so as to save power consumption as much as possible. In addition, when different communications protocols are used for communication, packaged data packets are defined according to the corresponding protocols.

The connection request should comprises device information of the shooting device, and the device information may comprise one or more of the following: a device ID of the shooting device, a position of the shooting device, shooting performance of the shooting device, and a relationship between the shooting device and the subject. The relationship may refer to one or more of: a distance between the shooting device and the subject, a shooting angle of the shooting device relative to the subject, and a face orientation of the subject within the viewfinder coverage of the shooting device. The device information of the shooting device may be used to provide a basis for selecting an appropriate shooting device by a subject. After receiving the connection request, the selectable subject may select a desired shooting device according to device information comprised in the connection request. For example, the selectable subject selects a shooting device with better shooting performance to shoot a photo or video for the selectable subject, or selects a shooting device with a better shooting angle to shoot a photo or video for the selectable subject, or the like.

Figure 7:
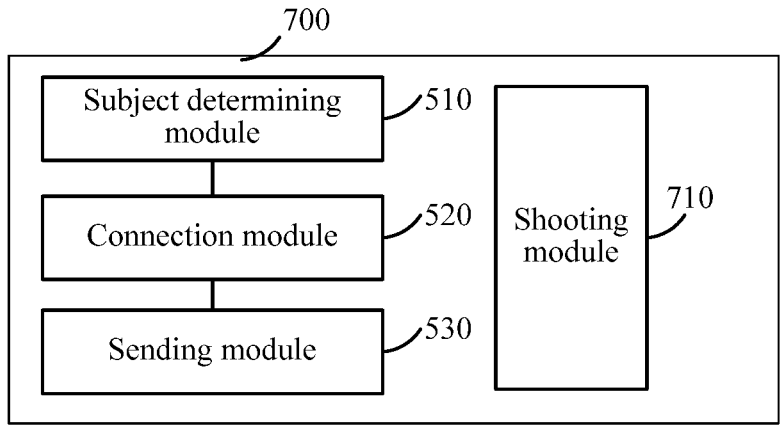
FIG. 7 is an example structural block diagram of a shooting apparatus according to another embodiment of the present application.

After the connection is established, according to an apparatus of an embodiment of the present application, the shooting device may be directly operated to shoot a photo or video, and shooting data is sent to the target device associated with the subject. Alternatively, according to an apparatus of an embodiment of the present application, the shooting device may be operated according to control of the selectable subject. As shown in FIG. 7, in addition to the modules and units shown in FIG. 5, a shooting apparatus 700 according to another embodiment of the present application further comprises:

a shooting module 710, configured to execute a shooting operation on the corresponding subject according to a control instruction from at least one target device associated with the subject.

In such case, the sending module 530 further comprises: a second sending unit, configured to send current shooting data of the shooting device to a target device associated with the selectable subject after the connection is established. On the target device, a desired control instruction may be generated automatically or by a user according to the current shooting data, for example, shooting parameters (a shutter parameter, an exposure parameter, an aperture parameter, etc.) are input automatically or by the user.

After the shooting device receives the control instruction, a shooting prompt is provided according to the control instruction. Then, a third sending unit of the sending module 530 sends shooting data of the associated subject to the target device with which the connection has been established.

It should be noted that, the shooting operation may comprise adjustment on shooting parameters and/or execution of shooting. The adjustment on shooting parameters comprises commands of adjusting one or more of: a position of the shooting device, a distance between the shooting device and the subject, an angle of the shooting device, lens aperture and white balance parameters of the shooting device, and the like, to achieve the best shooting effect of the shooting device for the subject. The execution of shooting comprises commands of executing photographing, starting shooting, pausing shooting, and ending shooting.

Figure 8:
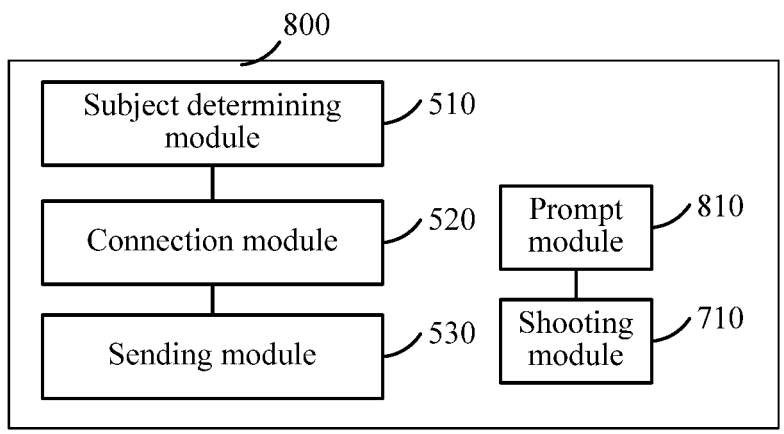
FIG. 8 is an example structural block diagram of a shooting apparatus according to a still another embodiment of the present application.

In order to ensure execution of the control instruction, as shown in FIG. 8, a shooting apparatus 800 according to a still another embodiment of the present application may further comprise a prompt module 810, configured to provide a shooting prompt according to the control instruction. The providing a shooting prompt means informing, in any one or more manners of a voice prompt, a visual prompt, and/or a vibration prompt, the shooting device or an operator of the shooting device of what operation needs to be performed next and how to perform the operation.

Figure 9:
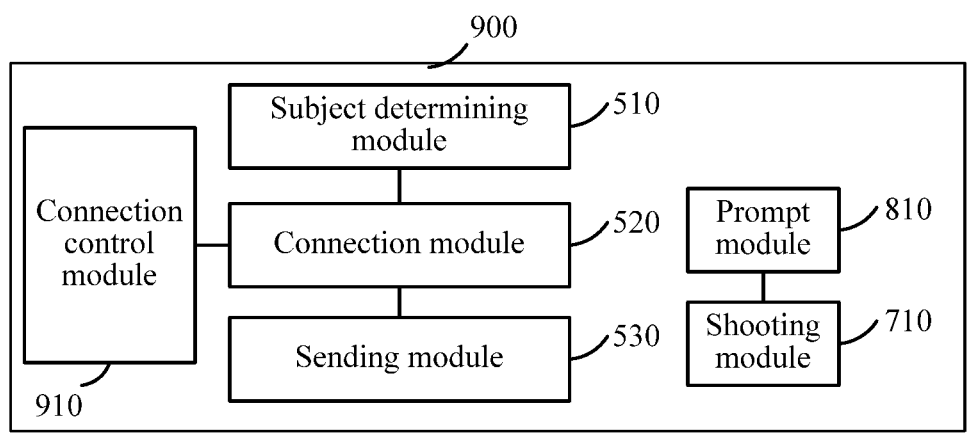
FIG. 9 is an example structural block diagram of a shooting apparatus according to still another embodiment of the present application.

In addition, the shooting in an apparatus of an embodiment of the present application establishes a communication connection by precisely positioning a selectable subject and a target device thereof based on sensor data and image information, thereby achieving precise transmission. Therefore, when a subject and a shooting device thereof can no longer be precisely positioned, the established connection may be disconnected, so as to save device resources. Therefore, as shown in FIG. 9, a shooting apparatus 900 according to still another embodiment of the present application may further comprise a connection control module 910, configured to disconnect the connection between the shooting device and the target device associated at a proper time. The connection control module 910 may disconnect the connection with the target device associated with the subject when the subject leaves a viewfinder coverage for the subject, or disconnect the connection with the target device associated with the subject when signal strength of the target device associated with the subject is lower than a set threshold. The set threshold may be set appropriately on the premise that transmission of shooting data is not affected. Moreover, the connection control module 910 may disconnect the connection with the target device associated with the subject when the shooting device cannot recognize the subject.

Further, according to actual applications, not all shooting data needs to be transmitted, and therefore the sending module 530 may first send part of the shooting data of the associated subject to the target device where the connection has been established, where the part of the shooting data is used to form a thumbnail on the target device. The user can select desired complete shooting data on the target device according to the thumbnail. Afterwards, corresponding shooting data is sent, according to a user selection, to the target device with which the connection has been established.

Certainly, the sending module 530 may also directly send all the shooting data to the corresponding target device after the shooting is completed.

Those skilled in the art can understand that, the modules and units having a sending function may be achieved by one component, as long as the component complies with different communications protocols according to requirements. The receiving function can be achieved in the same manner.

A method and an apparatus of one or more of the embodiments of the present application are further described below with a specific embodiment.

In a tourist attraction where a public camera is disposed, a user A carries a mobile phone A1, a handheld computer A2, and a camera A3, and a user B carries a mobile phone B1 and a digital camera B2. In order to take photos at a desired position, the user A can request the public camera C and the user B to take photos. According to the method and an apparatus of one or more of the embodiments of the present application, when the user A requests the user B to photograph the user A, the user A does not need to lend any device to the user B, and the user B can use the camera B2 carried by the user B to photograph the user A.

According to a method of one or more of the embodiments of the present application, The user A starts a BLE module of the mobile phone A1, and waves the arm with which the user A holds the mobile phone A1, and the mobile phone A1 correspondingly broadcasts sensor data related to the arm-waving action. At this time, the public camera C and the camera B2 of the user B collect images of the user A, and use respective BLE module to receive the sensor data. In the same scenario, the camera B2 of the user B and the public camera C both can receive sensor data from multiple devices, and when collecting images of the user A in response to a shooting request sent by the user A, the user B and the public camera C may inevitably collect images of other users within the same viewfinder coverage. Therefore, it is necessary to match the received sensor data with collected image information respectively on the side of the camera B2 and the public camera C, so as to establish an association relationship between the user A and any device (the mobile phone A1 is used as an example) associated with the user A. A target subject is the user A, and therefore, at this time, the user A accounts for a great proportion in the viewfinder coverage, and the camera B2 and the public camera C automatically select the user A as a subject, and separately send a connection request to the mobile phone A1 after the mobile phone A1 is used as an object to which the shooting data is transmitted subsequently, the connection request comprising respective device information of the camera B2 and the public camera C.

The user A selects a specified camera B2 as a shooting device according to the device information of the camera B2 and the public camera C, and sends a connection response to the camera B2 by using the mobile phone A1; therefore, a communication connection between the camera B2 and the mobile phone A1 is established.

After the connection is established, the user B sends data obtained in current shooting to the user A, and the user A generates a control instruction according to a current shooting effect and sends the control instruction to the user B. The control instruction may be input by means of, for example, touching by the user A, and sent to the user B.

After receiving the control instruction, the user B automatically or manually adjusts shooting parameters, and executes shooting.

After the shooting is ended, the user B may send part of the shooting data to the user A, where the part of the shooting data may form a thumbnail on the mobile phone A1 of the user A; the user A selects complete shooting data that the user A wants to acquire, and then the user B transmits the corresponding complete shooting data according to the selection of the user A.

In the above process, only determining of the subject and selection of data to be transmitted require manual intervention; search for the target device, connection, and transmission do not require manual intervention, and are highly accurate.

Figure 10:
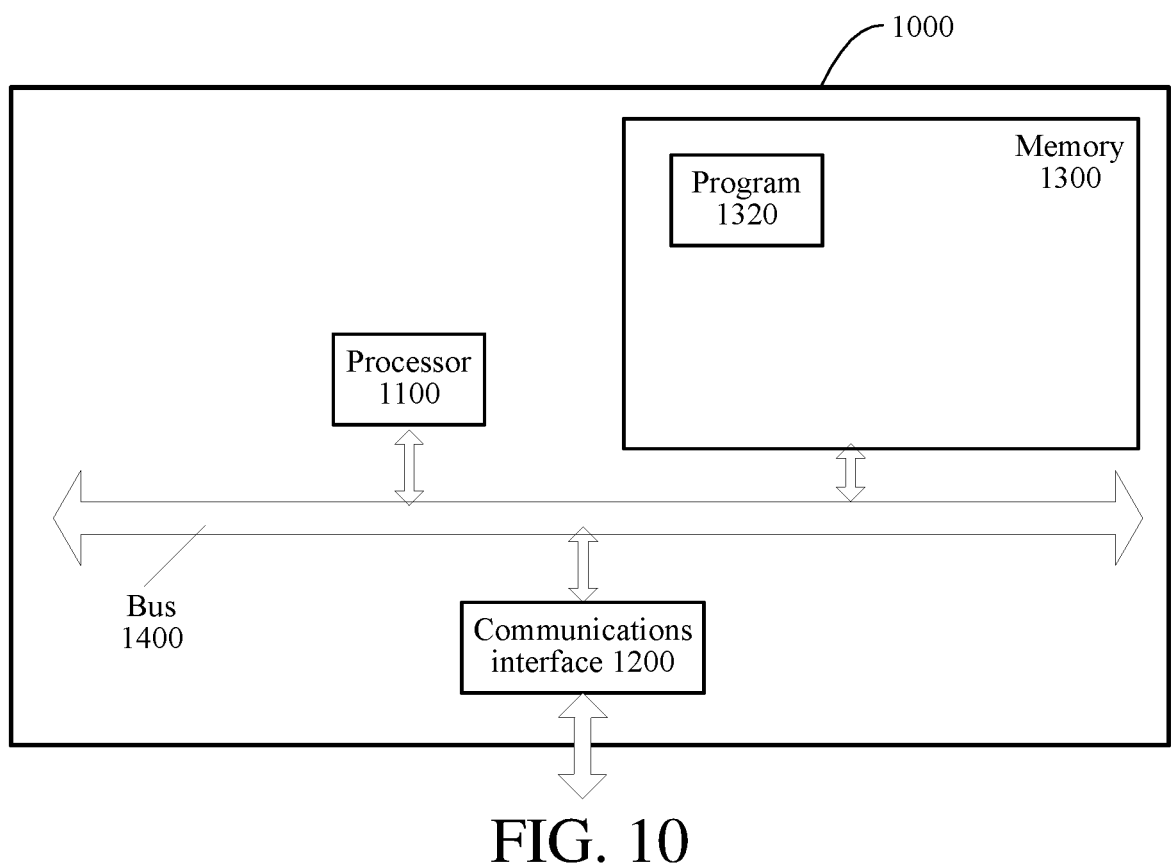
FIG. 10 is an example structural block diagram of a shooting apparatus according to still another embodiment of the present application.

As shown in FIG. 10, FIG. 10 shows a shooting apparatus 1000 according to still another embodiment of the present application; the specific embodiment of the present application does not limit specific implementation of the shooting apparatus 1000. As shown in FIG. 10, the shooting apparatus 1000 may comprise:

a processor 1100, a communications interface 1200, a memory 1300, and a communication bus 1400.

The processor 1100, the communications interface 1200, and the memory 1300 complete mutual communications through the communication bus 1400.

The communications interface 1200 is configured to communicate with a network element such as a client.

The processor 1100 is configured to execute a program 1320, and specifically, can execute relevant steps in the process embodiments shown in FIG. 1 to FIG. 4.

Specifically, the program 1320 may comprise program code, the program code comprising a computer operation instruction.

The processor 1100 may be a central processing unit (CPU), or an application specific integrated circuit (ASIC), or be configured to be one or more integrated circuits which implement one or more of the embodiments of the present application.

The memory 1300 is configured to store the program 1320. The memory 1300 may comprise a high-speed random access memory (RAM), and may also comprise a non-volatile memory, for example, at least one magnetic disk memory. The program 1320 may enable the apparatus 1000 to execute steps of:

determining a subject according to sensor data of a target device and image information of a selectable subject;
establishing a communication connection with at least one target device associated with the subject; and
sending shooting data of the associated subject to the target device with which the connection has been established.

Reference may be made to the corresponding steps or units in one or more of the embodiments for specific implementation of each unit in the program 1320, and details are not repeated herein.

It can be realized by those of ordinary skill in the art that each exemplary unit and method step described with reference to the embodiments disclosed herein may be implemented by electronic hardware or a combination of computer software and electronic hardware. Whether these functions are executed in a hardware manner or a software manner depends on particular applications and design constraints of the technical solution. The professional technicians may use different methods to implement the described functions with respect to each particular application, but it should not be considered that such implementation is beyond the scope of the present application.

If implemented in the form of a software functional unit and is sold or used as an independent product, the functions can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for instructing a computer module (for example, a personal computer, a server, or a network module) to execute all or some steps of the method described in each embodiment of the present application. The foregoing storage medium comprises various media capable of storing program code, such as a USB flash disk, a removable hard disk drive, a read-only memory (ROM), a RAM, a magnetic disk, or a compact disc.

The above implementations are only used to describe the present application, instead of limiting the present application; various modifications and variations can be made by those of ordinary skill in the art without departing from the spirit and scope of the present application. Therefore, all equivalent technical solutions also belong to the scope of the present application, and the scope of patent protection of the present application should be subject to the claims.

What is claimed is:

1. A shooting method, comprising:
    determining, by a shooting device comprising a processor and according to a preset policy, a shooting subject from at least one selectable subject represented in image information captured within a viewfinder coverage of the shooting device based on sensor data received from a target device being held by the shooting subject, wherein the preset policy is based on the sensor data and the image information, and the determining the shooting subject comprises:
        recognizing a first change in movement or posture of the shooting subject that is indicated in the sensor data,
        recognizing a second change in movement or posture of a selectable subject of the at least one selectable subject that is indicated in the image information,
        determining a match between the first change in movement or posture of the shooting subject that is indicated in the sensor data and the second change in movement or posture of the selectable subject of the at least one selectable subject that is indicated in the image information,
        based on the determining of the match, identifying the selectable subject as the shooting subject, and
        associating the target device with the shooting subject represented in the image information;
    establishing a communication connection with the target device being held by the shooting subject;
    executing a shooting operation on the shooting subject according to a control instruction from the target device being held by the shooting subject; and
    sending shooting data of the shooting subject to the target device with which the communication connection has been established.

2. The shooting method of claim 1, wherein the determining the match comprises:
    performing action recognition according to the sensor data.

3. The shooting method of claim 1, wherein the determining the shooting subject from the at least one selectable subject further comprises:
    selecting the selectable subject having a representation in the image information, wherein the representation comprises an area within the viewfinder coverage of the shooting device that exceeds a preset proportion as the shooting subject.

4. The shooting method of claim 1, wherein the determining the shooting subject from the at least one selectable subject comprises:
selecting the selectable subject having a representation in the image information, wherein the representation is located in a middle of the viewfinder coverage of the shooting device as the shooting subject.

5. The shooting method of claim 1, wherein the preset policy comprises:
determining the shooting subject according to a signal strength of a signal associated with the target device.

6. The shooting method of claim 1, wherein the determining the shooting subject from the at least one selectable subject comprises:
determining the shooting subject from the at least one selectable subject according to a user selection.

7. The shooting method of claim 1, wherein the establishing the communication connection further comprises:
sending a connection request to the target device being held by the shooting subject;
receiving a connection response from the target device; and
establishing the communication connection with the target device.

8. The shooting method of claim 7, further comprising receiving the sensor data from the target device
according to a first communications protocol.

9. The shooting method of claim 8, wherein the sending the connection request to the target device being held by the shooting subject comprises:
sending the connection request according to a second communications protocol.

10. The shooting method of claim 9, wherein the first communications protocol is at least one of a Bluetooth Low Energy (BLE) protocol, a WiFi protocol, a Bluetooth protocol, a ZigBee protocol, an Ultra-Wideband (UWB) protocol, an Infrared protocol, and a Near Field Communication (NFC) protocol.

11. The shooting method of claim 10, wherein the first communications protocol is different from the second communications protocol.

12. The shooting method of claim 11, wherein the connection request includes device information of the shooting device.

13. The shooting method of claim 12, wherein the device information includes at least one of a device ID of the shooting device, a position of the shooting device, a shooting performance of the shooting device, and a relationship between the shooting device and the shooting subject.

14. The shooting method of claim 13, wherein the relationship between the shooting device and the shooting subject includes a distance between the shooting device and the shooting subject, a shooting angle of the shooting device relative to the shooting subject, and a face orientation of the shooting subject within the viewfinder coverage of the shooting device.

15. The shooting method of claim 13, wherein the second communications protocol is at least one of a Bluetooth Low Energy (BLE) protocol, a WiFi protocol, a Bluetooth protocol, a ZigBee protocol, an Ultra-Wideband (UWB) protocol, an Infrared protocol, and a Near Field Communication (NFC) protocol.

16. The shooting method of claim 1, further comprising:
providing a shooting prompt according to the control instruction.

17. The shooting method of claim 16, wherein the shooting prompt includes at least one of a voice prompt, a visual prompt, or a vibration prompt.

18. The shooting method of claim 1, wherein the shooting operation comprises adjustment of a parameter of shooting or an execution of the shooting.

19. The shooting method of claim 1, wherein the sending the shooting data of the shooting subject to the target device with which the communication connection has been established further comprises:
sending a part of the shooting data of the shooting subject to the target device with which the communication connection has been established, wherein the part of the shooting data is used to form a thumbnail; and
sending complete shooting data to the target device according to a selection command received as user input on the thumbnail.

20. The shooting method of claim 1, further comprising:
disconnecting the communication connection with the target device being held by the shooting subject when the shooting subject leaves the viewfinder coverage for the shooting subject.

21. The shooting method of claim 1, further comprising:
disconnecting the communication connection with the target device being held by the shooting subject when a signal strength of the target device being held by the shooting subject is lower than a set threshold.

22. The shooting method of claim 1, further comprising:
disconnecting the communication connection with the target device being held by the shooting subject when the shooting device is unable to recognize the shooting subject.

23. A shooting apparatus, comprising:
a memory that stores executable modules; and
a processor, coupled to the memory, that executes the executable modules to perform operations of the shooting apparatus, the executable modules comprising:
a subject determining module configured to determine, according to a preset policy, a shooting subject from at least one selectable subject represented in image information captured within a viewfinder coverage of the shooting apparatus based on sensor data received from a target device being held by the shooting subject, wherein the preset policy is based on the sensor data and the image information, and the determination of the shooting subject comprises:
recognize a first change in movement or posture of the shooting subject that is indicated in the sensor data,
recognize a second change in movement or posture of a selectable subject of the at least one selectable subject that is indicated in the image information,
determine a match between the first change in movement or posture of the shooting subject that is indicated in the sensor data and the second change in movement or posture of the selectable subject of the at least one selectable subject that is indicated in the image information,
based on the determination of the match, identify the selectable subject as the shooting subject, and
associate the target device with the shooting subject represented in the image information;
a connection module configured to establish a communication connection with the target device being held by the shooting subject;
a shooting module configured to execute a shooting operation on the shooting subject according to a control instruction from the target device being held by the shooting subject; and a sending module configured to send shooting data of the shooting subject to the target device with which the connection has been established.

24. The shooting apparatus of claim 23, wherein the matching unit further comprises:
a recognition sub-unit configured to perform action recognition according to the sensor data.

25. The shooting apparatus of claim 23, wherein the association unit is further configured to select the selectable subject having a representation in the image information, wherein the representation comprises an area within the viewfinder coverage of the shooting apparatus the exceeds a preset proportion as the shooting subject.

26. The shooting apparatus of claim 23, wherein the association unit further is configured to select the selectable subject having a representation in the image information, wherein the representation is located in a middle position of the viewfinder coverage of the shooting apparatus as the shooting subject.

27. The shooting apparatus of claim 23, wherein the association unit is further configured to determine the shooting subject according to a signal strength of the target device.

28. The shooting apparatus of claim 23, wherein the association unit is further configured to determine the shooting subject from the at least one selectable subject according to a user selection.

29. The shooting apparatus of claim 23, wherein the connection module further comprises:
a first sending unit configured to send a connection request to the target device being held by the shooting subject; and
a second receiving unit configured to receive a connection response from the target device, and establish the communication connection with the target device.

30. The shooting apparatus of claim 29, further comprising first receiving unit is configured to receive the sensor data according to a first communications protocol.

31. The shooting apparatus of claim 30, wherein the first sending unit is configured to send the connection request according to a second communications protocol.

32. The shooting apparatus of claim 31, wherein the first communications protocol is different from the second communications protocol.

33. The shooting apparatus of claim 23, wherein the executable modules further comprise:
a prompt module configured to provide a shooting prompt according to the control instruction.

34. The shooting apparatus of claim 23, wherein the sending module further comprises:
a second sending unit configured to send a part of the shooting data of the shooting subject to the target device with which the communication connection has been established, wherein the part of the shooting data is used to form a thumbnail; and
a third sending unit configured to send corresponding complete shooting data to a corresponding target device according to a selection of the thumbnail.

35. The shooting apparatus of claim 23, wherein the shooting apparatus further comprises:
a control module configured to disconnect the communication connection with the target device being held by the shooting subject when the shooting subject leaves the viewfinder coverage for the shooting subject.

36. The shooting apparatus of claim 23, wherein the shooting apparatus further comprises:
a connection control module configured to disconnect the communication connection with the target device being held by the shooting subject when a signal strength of the target device associated with the shooting subject is lower than a set threshold.

37. The shooting apparatus of claim 23, wherein the shooting apparatus further comprises:
a connection control module configured to disconnect the communication connection with the target device being held by the shooting subject when the shooting device cannot recognize the shooting subject.

38. A computer readable storage device, comprising at least one executable instruction, which, in response to execution, causes a system comprising a processor to perform operations, comprising:
determining, according to a preset policy, a shooting subject from at least one selectable subject represented in image information captured within a viewfinder coverage of a shooting device based on sensor data received from a target device being held by the shooting subject, wherein the preset policy is based on the sensor data and the image information, and the determining the shooting subject comprises:
recognizing a first change in movement or posture of the shooting subject that is indicated in the sensor data,
recognizing a second change in movement or posture of a selectable subject of the at least one selectable subject that is indicated in the image information,
determining a match between the first change in movement or posture of the shooting subject that is indicated in the sensor data and the second change in movement or posture of the selectable subject of the at least one selectable subject that is indicated in the image information,
based on the determining of the match, identifying the selectable subject as the shooting subject, and
associating the target device with the shooting subject represented in the image information;
establishing a connection with the target device being held by the shooting subject;
executing a shooting operation on the shooting subject according to a control instruction from the target device being held by the shooting subject; and
sending shooting data of the shooting subject to the target device with which the connection has been established.

39. The computer readable storage device of claim 38, wherein the determining the match comprises:
performing action recognition according to the sensor data.

40. The computer readable storage device of claim 38, wherein the determining the shooting subject from the at least one selectable subject further comprises:
selecting the selectable subject having a representation in the image information, wherein the representation comprises an area within the viewfinder coverage of the shooting device that exceeds a preset proportion as the shooting subject.

41. A device, comprising a processor and a memory, wherein the memory stores executable instructions, the processor is connected with the memory via a communication bus, and when the device is operating, the processor executes or facilitates execution of the executable instructions stored by the memory to cause the device to perform operations, comprising:

determining, according to a preset policy, a shooting subject from at least one selectable subject represented in image information captured within a viewfinder coverage of a shooting device based on sensor data received from a target device being held by the shooting subject, wherein the preset policy is based on the sensor data and the image information, and the determining the shooting subject comprises:
  recognizing a first change in movement or posture of the shooting subject that is indicated in the sensor data,
  recognizing a second change in movement or posture of a selectable subject of the at least one selectable subject that is indicated in the image information,
  determining a match between the first change in movement or posture of the shooting subject that is indicated in the sensor data and the second change in movement or posture of the selectable subject of the at least one selectable subject that is indicated in the image information,
  based on the determining of the match, identifying the selectable subject as the shooting subject, and
  associating the target device with the shooting subject represented in the image information;
establishing a connection with the target device being held by the shooting subject;
executing a shooting operation on the shooting subject according to a control instruction from the target device being held by the shooting subject; and
sending shooting data of the shooting subject to the target device with which the connection has been established.

42. The device of claim 41, wherein the determining the match comprises:
  performing action recognition according to the sensor data.

43. The device of claim 41, wherein the determining the shooting subject from the at least one selectable subject comprises:
  selecting the selectable subject having a representation in the image information, wherein the representation comprises an area within the viewfinder coverage of the shooting device that exceeds a preset proportion as the shooting subject.

44. The device of claim 41, wherein the determining the shooting subject from the at least one selectable subject comprises:
  selecting the selectable subject having a representation in the image information, wherein the representation is located in a middle of the viewfinder coverage of the shooting device as the shooting subject.

45. The device of claim 41, wherein the determining the shooting subject from the at least one selectable subject comprises:
  determining the shooting subject according to a signal strength of a signal associated with the target device.

* * * * *